United States Patent [19]
Sinofsky

[11] Patent Number: 5,664,178
[45] Date of Patent: Sep. 2, 1997

[54] METHOD AND SYSTEM FOR ORGANIZING INTERNAL STRUCTURE OF A FILE

[75] Inventor: Steven J. Sinofsky, Seattle, Wash.

[73] Assignee: Microsoft Corporation, Redmond, Wash.

[21] Appl. No.: 477,084

[22] Filed: Jun. 7, 1995

Related U.S. Application Data

[63] Continuation of Ser. No. 909,245, Jul. 6, 1992, abandoned.

[51] Int. Cl.$^6$ ........................................ G06F 17/30
[52] U.S. Cl. ............................... 395/611; 395/777
[58] Field of Search ........................... 395/600, 650, 395/157, 154, 147, 149, 611, 777, 159; 380/30; 345/600

[56] References Cited

U.S. PATENT DOCUMENTS

| | | | |
|---|---|---|---|
| 4,899,136 | 2/1990 | Beard et al. | 345/156 |
| 5,089,956 | 2/1992 | MacPhail | 395/600 |
| 5,101,345 | 3/1992 | MacPhail | 395/600 |
| 5,162,992 | 11/1992 | Williams | 364/419 |
| 5,179,718 | 1/1993 | MacPhail | 395/800 |
| 5,204,947 | 4/1993 | Bernstein et al. | 395/157 |
| 5,237,679 | 8/1993 | Wang et al. | 395/600 |

OTHER PUBLICATIONS

Lee Keough, "The New Face of Computing", Computer Decisions, vol. 21, No. 2, Feb., 1989, pp. 36-41 Feb. 1989.
Keith Jones, "Are You Ready for Another New Wave?", ComputerWeekly, No. 1252, Mar. 7, 1991, pp. 38-39 Mar. 1991.
NewWave User's Guide, Hewlett-Packard Co., 1987, Chapter 5: "Filling and Organizing Your Work," pp. 85-100.
NeXTstep Concept User's Guide, NeXT Computer, Inc., 1990, "File Packages," pp. 2-37.
Crockett, David R., "The VM/SP 6 Shared File System," Conference Proceedings of SEAS Anniversary Meeting, Aalborg, Denmark, Sep. 26-30, 1988, vol. 1, pp. 399-441.
"Use of Subfiles as an Internal Organization Method," IBM Technical Disclosure Bulletin, IBM Corp., vol. 3, No. 9, Feb. 1991, pp. 182-183.
Xerox, US Series Reference Library Version 1.0, Xerox, El Segundo, Calif., 1985, pp. 1-18, 21-60.
B. Jeffrey, "IBM's Blueprint for Office Automation," PC Week, vol. 2, No. 18, May 7, 1985 pp. 57-60.
M. Kramer, "Tandem System Will Now Include IBM PC's and LANs," PC Week, vol. 2, No. 26, Jul. 2, 1985, pp. 11.

*Primary Examiner*—Thomas G. Black
*Assistant Examiner*—Paul R. Lintz
*Attorney, Agent, or Firm*—Seed and Berry LLP

[57] ABSTRACT

A method and system for storing data in a file is provided. The present invention provides for data to be organized within a compound document as a file bundle. A file bundle is a file system file that contains sub-files, which may be organized hierarchically. The data within a file bundle file is preferably stored in a format defined by the program that generates the data. The program that generates the data can open the file bundle created by another program and directly access the data within the file bundle file.

35 Claims, 7 Drawing Sheets

METHOD AND SYSTEM FOR ORGANIZING INTERNAL STRUCTURE OF A FILE

CROSS-REFERENCE TO RELATED APPLICATION

This application is a continuation of U.S. patent application Ser. No. 07/909,245, filed Jul. 6, 1992 and now abandoned.

TECHNICAL FIELD

This invention relates to a method and system of storing data in a computer system and, more particularly, to the storing of data in a compound document.

BACKGROUND OF THE INVENTION

Computer operating systems typically include a subsystem called a file system. A file system stores data in files. A file system provides an application programming interface (API) to facilitate accessing data stored on disk or other long-term storage medium. A file system API provides various functions that are invoked by an application program to access the data. Application programs control the internal format of a file and determine which data to store in which files. A file system typically allows files to be grouped into directories. Each directory may contain many files and many sub-directories. The sub-directories may also contain files and other sub-directories. A file system that groups files into directories and sub-directories is referred to as hierarchical file system.

Many application programs need to access various types of data. For example, word processing programs may combine data that is in text, graph, and spreadsheet format into a single document. A text format is known as the native format for word processing programs. A user of a word processing program may specify that graph or spreadsheet data that is stored in a file is to be included in the document. To do so, word processing programs may import data from files generated by a graph program or a spreadsheet program. Word processing programs typically need to know not only the internal format of the graphic and spreadsheet files, but also how to display or print the graph and spreadsheet data.

The marketability of a word processing program is enhanced by its ability to import data stored in many formats. However, it can be very time-consuming and expensive to adapt a word processing program to access data in a specific non-text format. To adapt to a word processing program, the developer would need a complete description of the specific format and then develop code to print, display, and possibly store the data. The effort needed to adapt a word processing program to a specific format is increased when the format is defined by another vendor. The vendor may not publish a complete specification of the format or may change the format without notice. Consequently, an application program developer may choose to support only a few of the more popular file formats other than the native file format.

One solution that has been suggested is that word processing programs invoke the application program that generated the data in the specific non-text format to display or print the non-text data that is part of a word processing document. For example, if a document incorporates a graph, then the word processing program would invoke the graph program that generated the data to print or display the graph or to perform some other task using the data. However, unless the graph program was developed specifically to be invoked by a particular word processing program, it may not be practicable to invoke the graph program. Graph programs typically expect data to be stored in a certain format and in a file with only graph data.

Several approaches have been suggested to allow a word processing program to invoke other programs to print, display, or otherwise process non-text data that is part of a word processing document. A first approach modifies each of the programs that generate the non-text data so that they know the internal format of the word processing document, can retrieve the non-text data from the document, and can process the retrieved data. This approach can be expensive because the programs would need to know the internal format for each word processing program.

A second approach stores each component of the word processing document in a separate file. Using this approach, data would be stored in the native format of each application program. Thus, the application program could be invoked to process the native data directly. However, this second approach jeopardizes the integrity of the word processing document. Users typically can delete a file using the operating system commands. A user could delete one of the files that is part of a word processing document. The word processing document would then have a link to a deleted file.

SUMMARY OF THE INVENTION

It is an object of the present invention to provide a method and system for managing a compound document.

It is another object of the present invention to provide a compound document interface that parallels the interface of the underlying file system.

It is another object of the present invention to provide a compound document system in which existing applications can be converted to use the system with minimal conversion costs.

These and other objects, which will become apparent as the invention is more fully described below, are obtained by a method and system for allowing application programs to store data in a compound document. The present invention provides for data to be organized within a compound document as a file bundle. A file bundle is a file system file that contains sub-files, which may be organized hierarchically. The data within a file bundle file is preferably stored in a format defined by the program that generates the data (native data). The program that generates the data opens the file bundle created by another program and stores and retrieves data within the file bundle file.

DETAILED DESCRIPTION OF THE INVENTION

In a preferred embodiment, the present invention provides a method and system for allowing application programs to share data stored in a compound document. A compound document is a disk file that contains data generated by various applications. The present invention provides for data to be organized within the compound document as a file bundle. A file bundle is a file system file that contains sub-files, which may be organized hierarchically. A sub-file is referred to as a file bundle file. The data within a file bundle file is preferably stored in the native format defined by the generating program. For example, if a word processing document contains spreadsheet data, then a file bundle file would contain the native data in the format generated by the spreadsheet program.

Figure 1:
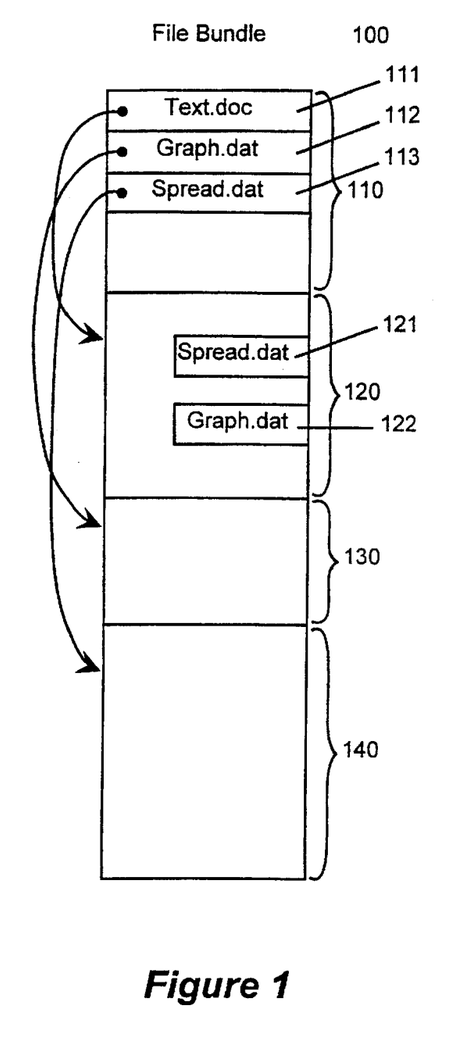
FIG. 1 is a diagram of a typical layout of a file bundle of the present invention.

FIG. 1 shows a typical layout of a file bundle of the present invention. The file bundle is a file system file that is created using the file system APIs. The file bundle 100 comprises a directory 110, a text file bundle (FB) file 120, a graph FB file 130, and a spreadsheet FB file 140. The directory 110 contains an entry 111, 112, and 113 for each FB file. The entries each contain a pointer to the corresponding FB file and other information such as length of FB file and time of creation. In a preferred embodiment, the directory entries contain data that is similar to the type of data stored in the directories of the file system. The text FB file 120 contains link 121 to the graph FB file and link 122 to the spreadsheet FB file. The links 121 and 122 indicate that the graph and spreadsheet data are part of the document.

Figure 2:
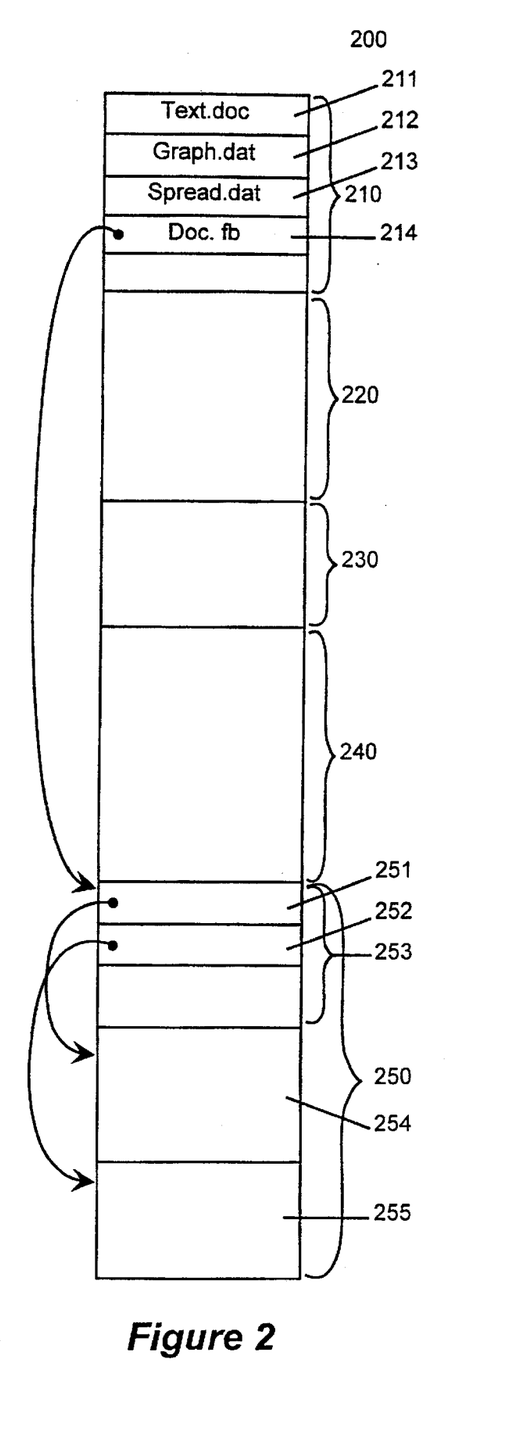
FIG. 2 is a diagram of a file bundle that contains a file bundle file that is a file bundle.

In a preferred embodiment, an FB file bundle can contain a file which is itself a file bundle. An FB file can include a directory pointer to format nested file bundle files. This nesting of file bundles is analogous to a hierarchical directory structure. This nesting allows compound documents to be included within a compound document. Thus, a file bundle for a word processing document can contain a file bundle file for a spreadsheet data, which in turn contains graph data. FIG. 2 shows a file bundle that contains an FB file that is a file bundle. The file bundle 200 contains directory 210 with four entries 211, 212, 213, and 214. Directory entry 214 points to FB file 250 and contains an indicator that it points to an FB file that is a file bundle. FB file 250 contains directory 253 with entries 251 and 252 which point to FB files 254 and 255.

Although FIGS. 1 and 2 show one embodiment, one skilled in the art would appreciate that other methods of storing the directory and files of a file bundle would be acceptable. For example, it is preferable to structure a file bundle in a manner that is similar to the directory and file structure of the file system.

Existing application programs can access data that is stored in a file system file in native format. However, these applications were not developed to access their native data that is stored within a file bundle file. The present invention also provides a file bundle API that allows an existing application program with minimal modifications to access native data in a file bundle file.

The present invention is described as implemented on a computer system with non-multitasking operating systems such as MS-DOS, developed by Microsoft Corporation. However, one skilled in the art would appreciate that the present invention could be implemented on a computer system with a multitasking operating system. MS-DOS allows a program (parent program) to load and execute another program (child program). When the child program completes, control is returned to the parent program. In this way, a parent program can load a child program to access its native data in a compound document created by the parent program. However, MS-DOS maintains only a single file pointer for each open file. A file pointer points to the current point at which the next read or write will occur. MS-DOS allows a program (parent program) to load another program (child program) that also opens the file, then changes in the file pointer that the child program makes will affect the parent program.

An operating system that supports only a single file pointer for each open file as described above is said to support only a single data stream. The methods of the present invention provide for implementing multiple data streams within a single file system data stream. Using these methods, existing applications can be modified to use file bundles without having to be concerned with a child program changing a file pointer.

The present invention allows for a plurality of application programs (parent and children) to have the same file bundle open, maintains a separate file pointer for each application program, and allows each application program to store data in its native format within the open file bundle.

Figure 3:
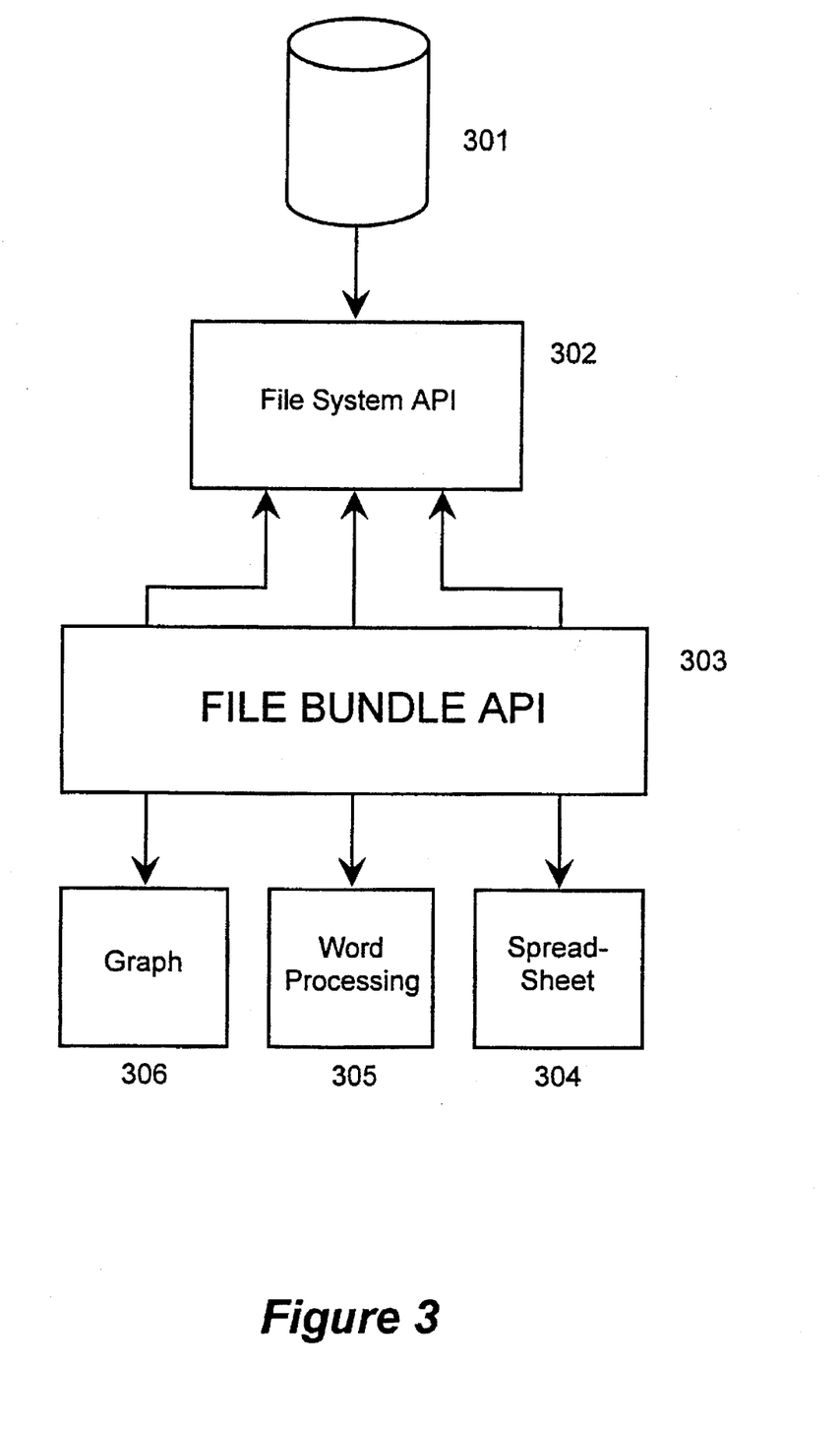
FIG. 3 shows the interface between the file bundle API and the file system API.

FIG. 3 is a schematic diagram showing the interface between the file bundle API and the file system API. As described above, the file system 302 provides functions to access the storage medium 301. In one embodiment, the functions provided by the file bundle API 303 parallel the functions provided by the file system API 302. For example, as one skilled in the art would appreciate, a typical file system API includes the following functions:

| | |
|---|---|
| fcreate | to create a file |
| fcreatedir | to create a directory |
| fopen | to open a file |
| fclose | to close a file |
| fread | to read from a file |
| fwrite | to write to a file |
| fseek | to position a location pointer |

The file bundle API 303 preferably includes the following functions:

| | |
|---|---|
| fFBcreate | to create a file bundle |
| fFBOpen | to open a file bundle |
| fFBFcreate | to create an FB file |
| fFBFOpen | to open a file bundle file |
| fFBFcreatedir | to create an FB directory |
| fFBFclose | to close an FB file |
| fFBFread | to read from an FB file |
| fFBFwrite | to write to an FB file |
| fFBFseek | to position an FB file pointer |

When a word processing program, in accordance with the present invention, creates a document that is to contain text, graph, and spreadsheet data, it creates a file bundle to store the data. The word processing program would typically receive the names of file system files that contain the graph and spreadsheet data in their native formats. The word processing program creates one file bundle file for the graph data and one file bundle file for the spreadsheet data. The word processing program then opens the file system files and copies the data from the graph and spreadsheet files to the corresponding file bundle files. When the word processing program displays or prints the graph or spreadsheet data, it invokes the graph or spreadsheet program that created the data. When invoking the application program, the word processing program passes it the name of the file bundle, the name of the file bundle file, and parameters relating to the function to perform (e.g., display data). The application program then uses function fFBopen to open the file bundle, function fFBFopen to open the file bundle file, and function fFBFread to read the data and then display it. These functions, which are provided by the present invention and are described below in detail maintain a file pointer for each program that has a file bundle open. The word processing program is said to be a client of the application program which is the server.

Figure 4:
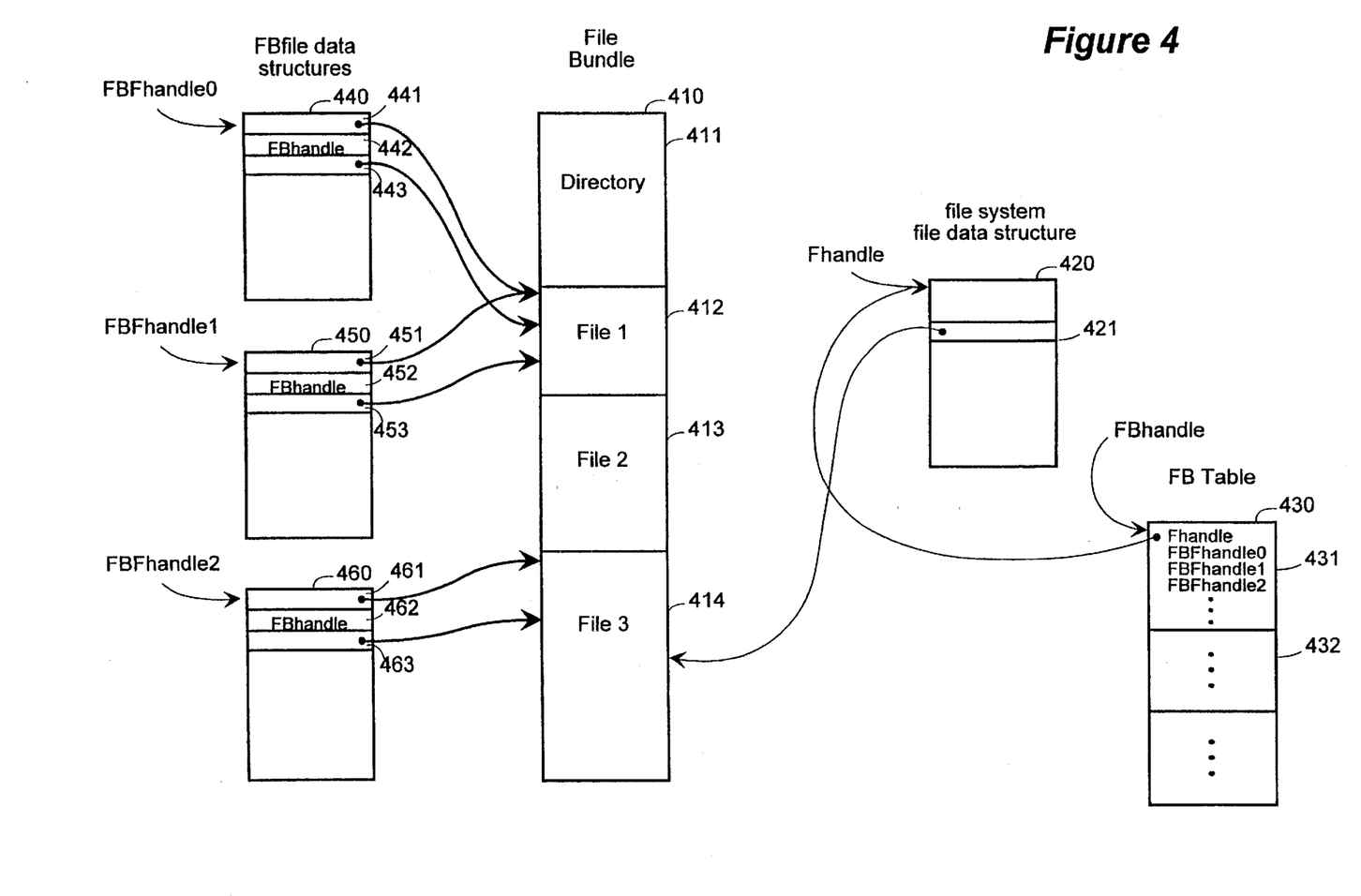
FIG. 4 is a schematic diagram of sample data structures for storing data in an embodiment of the present invention.

FIG. 4 is a schematic diagram of sample data structures for storing data in an embodiment of the present invention. File bundle 410 contains directory 411 and files 412, 413, and 414. The directory structure and each file are shown as logically contiguous. One skilled in the art would appreciate that there are well-known file systems techniques, such as the file allocation table (FAT) method of MS-DOS for storing logically contiguous data non-contiguously. In a preferred embodiment, the File Bundle API implements a FAT type scheme for storing data within a file Bundle. When the file bundle 410 is opened (using fFBopen), the file system initializes data structure 420 to contain the current state of the file. Data structure 420 contains file pointer 421, which contains the file pointer for file bundle 410. File pointer 421 is the single file pointer that the file system maintains. When a file bundle is opened (using the function fFBopen), the File Bundle API adds an entry to the file bundle table (FBTable) 430. The FBTable contains an entry for each open file bundle. The entries contains the handle for the open file (Fhandle), which is the file system supplied handle, and a handle for each open file bundle file (FBFhandle) within the file bundle which is a File Bundle API-generated handle. For example, entry 431 contains the handle corresponding to the file bundle 410 and the handles corresponding to each occurrence of an open file bundle file. Each entry is identified by a file bundle handle (FBhandle). The File Bundle API allocates a file bundle file data structure each time an application opens a file bundle file (using fFBFopen). The file bundle file data structures, such as data structures 440, 450, and 460, each contain a pointer to the start of the file bundle file within the file bundle, a file pointer for the file bundle file, and the handle of the file bundle within the FBTAble 430. In a preferred embodiment, the File Bundle API maintains a data structure similar to the file system file data structure for each file bundle file that contains a directory.

Figure 5:
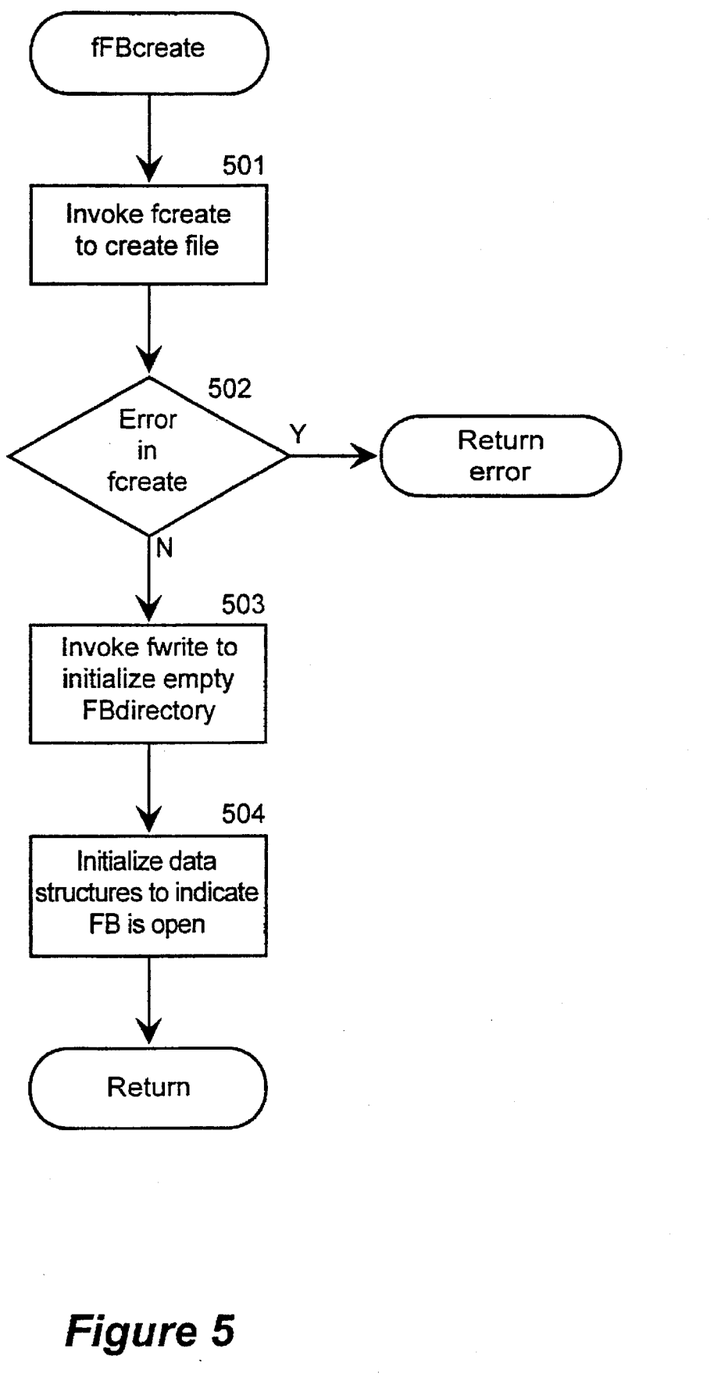
FIG. 5 is an overview flow diagram of function fFBcreate, which creates a file bundle.

FIG. 5 is an overview flow diagram of function fFBcreate, which creates a file bundle. The parameters passed to and received from this function preferably correspond to those of the function fcreate of the File System API 302, which the File Bundle API 303 uses. The function returns a handle to the created file bundle which create a file system file data structure 420 and returns a handle to the file bundle. In step 501, the function invokes function fcreate to create the file bundle which creates a file system file data structure 420 and returns a handle to the file handle. In step 502, if an error is returned from the function fcreate, then the function returns with an error, else the function continues at step 503. In step 503, the function invokes function fwrite to initialize the file bundle. This initialization would typically include initializing the directory hierarchy and file allocation tables. In step 504, the function initializes the FBTable 430 for the created file bundle and then the function returns with an FBhandle pointing to FBTable entry.

Figure 6:
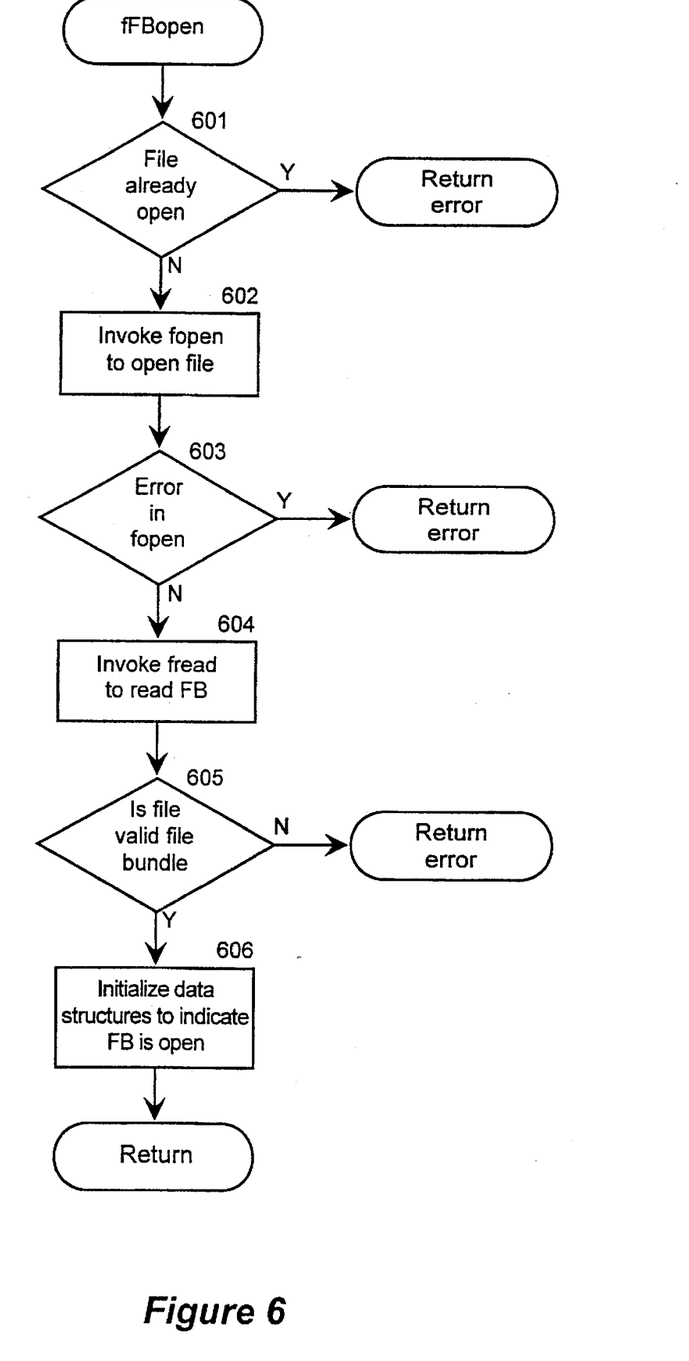
FIG. 6 is an overview flow diagram of function fFBopen, which opens an existing file bundle.

FIG. 6 is an overview flow diagram of function fFBopen, which opens an existing file bundle. The parameters passed to and received from this function preferably correspond to those of function fopen. The function returns a handle to the opened file bundle. In step 601, if the file is already open as indicated by the FBTable, then the function returns an error, else the function continues at step 602. In step 602, the function invokes function fopen to open the file bundle. In step 603, if an error is returned from the function fopen, then the function returns an error, else the function continues at step 604. In step 604, the function invokes function fread to read identifying data from the file bundle. In step 605, if the opened file is a valid file bundle, then the function continues at step 606, else the function returns an error. In step 606, the function allocates and initializes an FBTable for the opened file bundle and the function returns.

Figure 7:
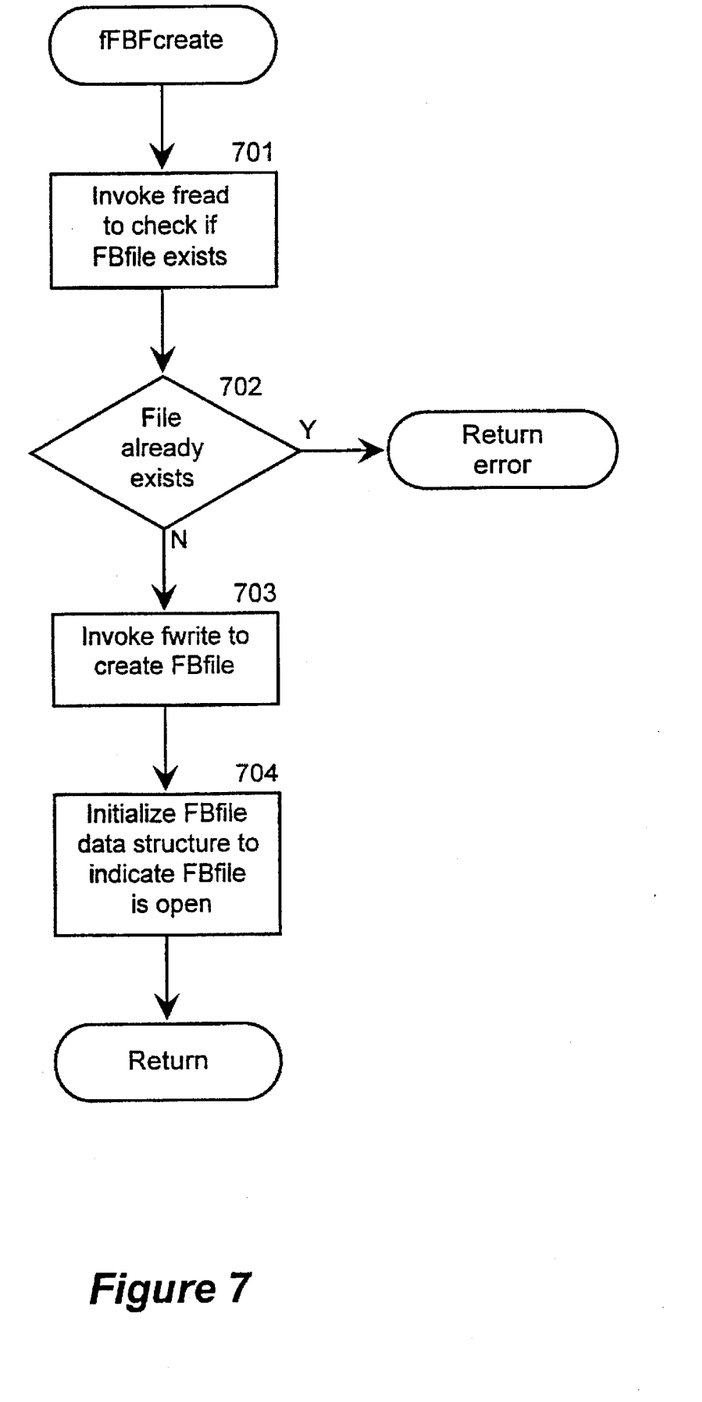
FIG. 7 is an overview flow diagram of function fFBFcreate, which creates a file bundle file.

FIG. 7 is an overview flow diagram of function fFBFcreate, which creates a file bundle file. The parameters passed to and received from this function preferably correspond to those of function fcreate. The function is passed the file bundle handle (FBhandle) and returns a handle (FBFhandle) to the open file bundle file. In step 701, the function invokes function fread to read the file bundle directory to determine whether the file bundle file already exists. In step 702, if the file bundle file already exists, then the function returns with an error, else the function continues at step 703. In step 703, the function invokes function fwrite to create the file bundle file. This creation includes the adding a directory entry to the file bundle. In step 704, the function allocates and initializes a file bundle file data structure for the created file bundle file and returns.

Function fFBFopen is similar to function fFBFcreate. The main difference is that the file bundle file that is to be opened must already exist.

Figure 8:
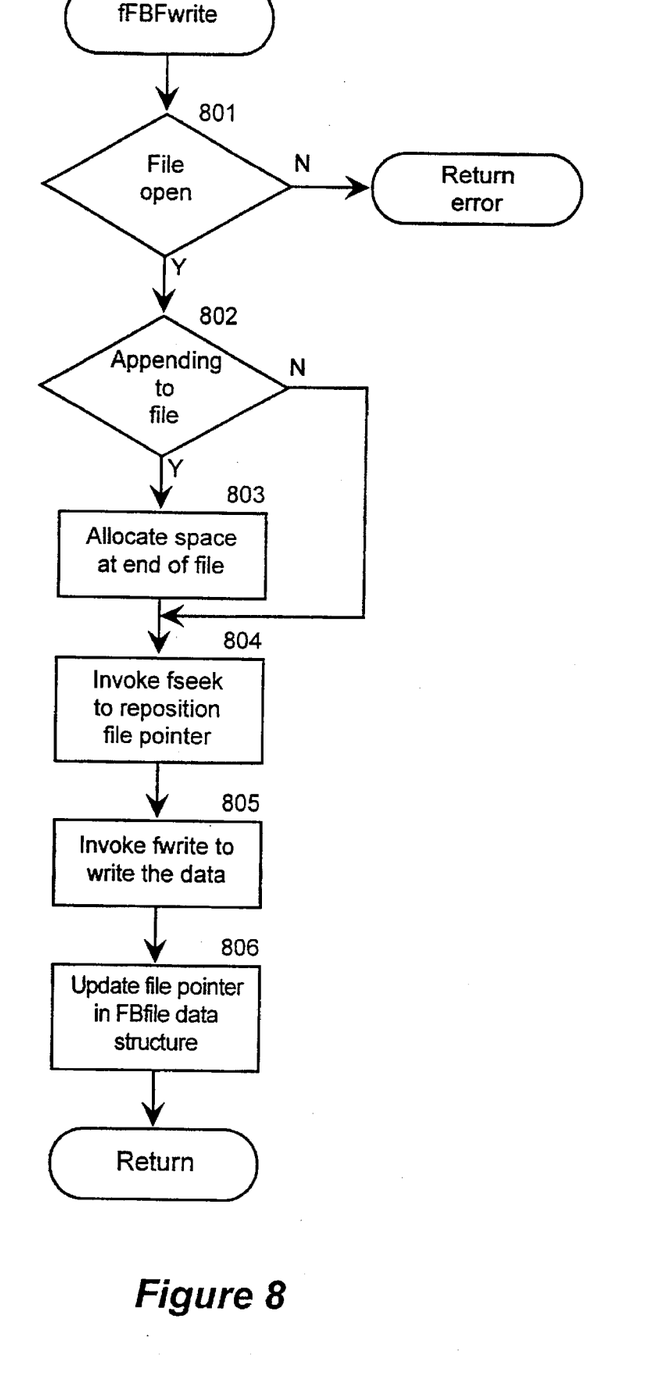
FIG. 8 is an overview flow diagram of function fFBFwrite, which writes data to a file bundle file.

FIG. 8 is an overview flow diagram of function fFBFwrite, which writes data to a file bundle file. The parameters passed to and received from this function preferably correspond to those passed to function fwrite. The function is passed the handle (FBFhandle) of the file bundle file. In step 801, if the file bundle file is open (the function checks to ensure that the handle points to a valid FBfiledata structure), the function continues at step 802, else the function returns an error. In step 802, if the write requires increasing the file size, then the function continues at step 803, else the function continues at step 804. In step 803, the function allocates space within the file bundle for the file bundle file. In step 804, the function invokes function fseek to position the file pointer for the file bundle to correspond to the location within the file bundle file at which to start the write. In step 805, the function invokes function fwrite to write the data to the file. In step 806, the function updates the file bundle file pointer in the file bundle file data structure and the function returns.

Function fFBFread is similar to function fFBFwrite. The main difference is that no space is allocated on a read.

Function fFBFseek performs a function that is analogous to function fseek. The function fFBFseek is passed a file bundle file handle and repositions the file pointer for that file bundle file.

Although the present invention has been described in terms of a preferred embodiment, it is not intended that the invention be limited by these embodiments. The scope of the present invention is defined by the claims that follow.

I claim:

1. A method in a computer system having a processor, the method for storing data within a compound document having data stored in a plurality of processor, the computer system having a file system for organizing data into files of the file system that executes on the processor, the method comprising the steps of:

creating a file of the file system;

storing a directory structure within the created file, the directory structure for pointing to sub-files contained within the created file; for each computer program creating a sub-file within the created file by allocating a location for the sub-file and by storing a name of the sub-file and the allocated location in the directory structure; and storing data in the native format of the computer program in the created sub-file at the allocated location wherein the data in the native format is accessible by the computer program.

2. A method in a computer system having a processor, the method for accessing data within a file bundle, the file bundle being a file system file accessed using a file system that executes on the processor, the file bundle having a directory and a plurality of file bundle files, the method comprising the steps of:

under control of a first application executing on the processor, opening the file bundle;

identifying a file bundle file that contains data generated by a second application program; and requesting the second application program to access the data in the identified file bundle file; and under control of the second application executing on the processor, opening the file bundle;

opening the identified file bundle file within the opened file bundle; and accessing data within the opened file bundle file.

3. A method in a computer system having a processor, the method for storing data generated by a plurality of applications within a file system file accessed using a file system that executes on the processor, the method comprising the steps of:

creating a file system file;

storing a directory structure within the created file system file;

creating a sub-file within the created file system file for storing data generated by an application that executes on the processor;

requesting that the application that generates the data to store the data in the created sub-file; and under control of the requested application, storing the generated data in the created sub-file.

4. A method in a computer system having a processor, the method for storing a plurality of sub-flies within a file system file of a file system, the file system for providing access to the file system file and being executed on the processor, each sub-file having data and a name, the method comprising the computer-implemented steps of:

under control of an application program that executes on the processor, requesting the file system to create the file system file;

requesting the file system to store data representing a directory structure within the file system file, the directory structure for mapping the name of each sub-file to a location within the file system file at which the sub-file is stored; and for each of the sub-flies, identifying a location within the file system file in which to store the sub-file;

requesting the file system to store data of the sub-file at the identified location within the file system file; and requesting the file system to store data that maps the name of the sub-file to the identified location in the directory structure within the file system file.

5. The method of claim 4 including the steps of:

under control of the file system, in response to the request to create the file system file, creating the file system file; and in response to the requests to store data, storing the requested data in the file system file.

6. The method of claim 4 including the steps of:

under control of a second application program that executes on the processor, identifying a location within the file system file in which to store a sub-file of the second application program;

requesting the file system to store data of the sub-file of the second application program at the identified location within the file system file; and requesting the file system to store data that maps the name of the sub-file of the second application program to the identified location in the directory structure within the file system file.

7. The method of claim 6 wherein the data of the sub-file of the second application program is in a native format of the second application program.

8. The method of claim 4 wherein one of the plurality of sub-files contains a plurality of sub-sub-files and contains a sub-file directory structure, each sub-sub-file having data and a name, the sub-file directory structure for mapping the name of each sub-sub-file to a location within the one of the plurality of sub-files at which the sub-sub-file is stored.

9. The method of claim 4 wherein the file system has a directory structure that is similar in structure to the directory structure within the file system file.

10. A method in a computer system having a processor, the method for creating a sub-file within a file bundle, the file bundle being a file system file accessible by a file system that executes on the processor, the file system having a file system implementation for a create function, the create function for creating a file system file of the file system, the computer system having a child computer program that executes on the processor and has an invocation of the create function for creating a file system file, the method comprising the computer-implemented steps of:

providing a file bundle implementation of the create function, the file bundle implementation for creating a sub-file within a file bundle;

starting execution of a parent computer program on the processor;

under control of the parent computer program, creating the file bundle file using the file system implementation of the create function;

starting execution of the child computer program wherein the invocation of the create function is linked to the file bundle implementation of the create function; and under control of the child computer program, involving the create function wherein the linked file bundle implementation of the create function is executed to effect creation of the sub-file within the file bundle file.

11. The method of claim 10 wherein the sub-file has data and a name, wherein the file bundle includes a directory structure for mapping the name of the sub-file to a location within the file bundle at which to store the data of the sub-file, and wherein during invocation of the file bundle implementation of the create function, storing in the directory structure of the file bundle the name of the sub-file and the location at which to store the data of the sub-file.

12. The method of claim 10 wherein the data of the sub-file is in a native format of the child computer program.

13. The method of claim 10 wherein the sub-file includes a directory structure for mapping each name of a plurality of sub-sub-files of the sub-file to a location within the sub-file.

14. The method of claim 10 wherein the file system implementation of the create function and the file bundle implementation of the create function use parameters that are identical.

15. A method in a computer system for providing a plurality of application program data streams for accessing a single file system data stream, the computer system having a single data stream access mechanism for accessing the file system data stream, the single data stream access mechanism having a file system file pointer indicating a position in the file system data stream, the single data stream access mechanism for accessing data of the file system data stream at the position of the file system file pointer, the method comprising the computer-implemented steps of:

for each of the plurality of application program data streams,
receiving a request to set the file system file pointer to a position in the file system data stream;
in response to receiving the request to set the file system file pointer, setting an application file pointer for the application program data stream to the requested position;
receiving a request to access the file system data stream; and
in response to receiving the request to access the file system data stream,
retrieving the application program file pointer for the application program data stream;
setting the file system file pointer to the retrieved application program file pointer; and
accessing the file system data stream using the single data stream access mechanism whereby data is accessed at the position indicated by the application program file pointer of the application program data stream.

16. The method of claim 15, further including the step of accessing data in a native format of each application program.

17. The method of claim 15 wherein the file system data stream is stored on a data storage device.

18. A method in a computer system of accessing data in a file bundle, the computer system having a processor and a file system that executes on the processor, the file bundle being a file of the file system, the file bundle containing a directory structure and a plurality of sub-files, the directory structure for mapping identifiers of each sub-file to locations within the file bundle at which the sub-file is contained, the method comprising the steps of:

under control of first application program executing on the processor,
opening the file bundle by invoking an open operation provided by the file system;
identifying within the opened file bundle a sub-file that contains data generated by a second application program; and
requesting the second application program to access the data in the identified sub-file; and
under control of the second application program executing on the processor, opening the file bundle by invoking the open operation provided by the file system;
opening the identified sub-file by invoking a sub-file open operation wherein the sub-file open operation accesses the directory structure of the file bundle to determine a location of the identified sub-file within the file bundle; and
accessing data of the opened sub-file.

19. The method of claim 18 wherein the data generated by the second application program is in a native format of the second application program.

20. A computer-readable memory for a computer system having a processor, the computer system having a file system that executes on the processor, the memory containing a file of the file system, the file comprising:

a plurality of sub-files, each sub-file having data and an identifier and being stored at a location within the file, the data of each sub-file being generated by an application program that executes on the processor and being in a native format of the generating application program; and
a directory structure for mapping the identifier of each sub-file to the location of the sub-file whereby the generating application program for each sub-file can access the sub-file.

21. The method of claim 3 wherein the step of storing the generated data in the created sub-file includes the step of increasing the size of the file system file to accommodate the generated data.

22. A computer-readable medium whose contents cause a computer system having a processor to store data generated by a plurality of applications within a file system file using a file system that executes on the processor by performing the steps of:

creating a file system file;
storing a directory structure within the created file system file;
creating a sub-file within the created file system file for storing data generated by an application that executes on the processor;
requesting that the application that generates the data to store the data in the created sub-file; and
under control of the requested application, storing the generated data in the created sub-file.

23. A computer-readable medium whose contents cause a computer system to provide a plurality of application program data streams for accessing a single file system data stream, the computer system having a single data stream access mechanism for accessing the file system data stream, the single data stream access mechanism having a file system file pointer indicating a position in the file system data stream, the single data stream access mechanism for accessing data of the file system data stream at the position of the file system file pointer, by performing the steps of:

for each of the plurality of application program data streams,
receiving a request to set the file system file pointer to a position in the file system data stream;
in response to receiving the request to set the file system file pointer, setting an application file pointer for the application program data stream to the requested position;
receiving a request to access the file system data stream; and
in response to receiving the request to access the file system data stream, retrieving the application program file pointer for the application program data stream;

setting the file system file pointer to the retrieved application program file pointer; and accessing the file system data stream using the single data stream access mechanism whereby data is accessed at the position indicated by the application program file pointer of the application program data stream.

24. A method in a computer system for manipulating files in a file bundle and the file bundle as a whole both under the control of an application program, the method comprising the steps of:

under the control of the application program, issuing a command to manipulate a single file within the file bundle;

under the control of a file system capable of manipulating files within the file bundle, manipulating the file within the file bundle in accordance with the issued command;

under the control of the application program, issuing a command to manipulate the file bundle as a whole; and under the control of a file system capable of manipulating the file bundle as a whole, manipulating the file bundle in accordance with the issued command.

25. The method of claim 24 wherein the step of manipulating the file bundle includes the step of deleting the file bundle.

26. The method of claim 24 wherein the step of manipulating the file bundle includes the step of renaming the file bundle.

27. The method of claim 24 wherein the step of manipulating the file bundle includes the step of copying the file bundle.

28. The method of claim 24 wherein the step of manipulating the file bundle includes the step of moving the file bundle.

29. The method of claim 24 wherein the step of manipulating the file within the file bundle includes the step of changing the contents of the file within the file bundle.

30. A computer-readable medium whose contents cause a computer system to manipulate files in a file bundle and the file bundle as a whole both under the control of an application program by performing the steps of:

under the control of the application program, issuing a command to manipulate a single file within the file bundle;

under the control of a file system capable of manipulating files within the file bundle, manipulating the file within the file bundle in accordance with the issued command;

under the control of the application program, issuing a command to manipulate the file bundle as a whole; and under the control of a file system capable of manipulating the file bundle as a whole, manipulating the file bundle in accordance with the issued command.

31. The computer-readable medium of claim 30 wherein the step of manipulating the file bundle includes the step of deleting the file bundle.

32. The computer-readable medium of claim 30 wherein the step of manipulating the file bundle includes the step of renaming the file bundle.

33. The computer-readable medium of claim 30 wherein the step of manipulating the file bundle includes the step of copying the file bundle.

34. The computer readable medium of claim 30 wherein the step of manipulating the file bundle includes the step of moving the file bundle.

35. The computer-readable medium of claim 30 wherein the step of manipulating the file within the file bundle includes the step of changing the contents of the file within the file bundle.

\* \* \* \* \*

UNITED STATES PATENT AND TRADEMARK OFFICE
CERTIFICATE OF CORRECTION

PATENT : 5,664,178
DATED : September 2, 1997
INVENTOR(S): Steven J. Sinfosky

It is certified that error appears in the above-identified patent and that said Letters Patent is hereby corrected as shown below:

In column 6, claim 1, line 3, following "of", please insert --formats, each format being a native format of a computer program that executes on the --.

In column 7, claim 4, line 2, following "of", please delete "sub-flies", and insert --sub-files--.

In column 7, claim 4, line 15, following "the", please delete "sub-flies", and insert --sub-files--.

In column 8, claim 10, line 22, following "program", please delete "involving" and insert --invoking--.

In column 9, claim 18, line 9, following "of", please insert --a--.

In columns 11 and 12, please delete claims 24, 25, 26, 27, 28, 29, 30, 31, 32, 33, 34 and 35.

Signed and Sealed this

Tenth Day of February, 1998

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,664,178

DATED : September 2, 1997

INVENTOR(S) : Sinofsky et al.

It is certified that error appears in the above-identified patent and that said Letters Patent is hereby corrected as shown below:

Column 3, lines 35-36, please change "In a preferred embodiment, an FB file bundle can contain a file which is itself a file bundle." to --In a preferred embodiment, a file bundle can contain an FB file which is itself a file bundle.--

Column 3, line 42, please change "for a spreadsheet data" to --for spreadsheet data--.

Column 5, line 11, after "detail" please add --,--.

Column 5, line 22, please change "Bundle" to --bundle--.

Column 5, line 30, please change "fFBFopen" to --fFBopen--.

Column 5, line 32, please change "entries" to --entry--.

Column 5, line 55, please change "create" to --creates--.

Column 6, line 15, after "FBTable" please add --entry--.

Column 6, line 41, please change "FBfiledata" to --FBfile data--.

UNITED STATES PATENT AND TRADEMARK OFFICE
CERTIFICATE OF CORRECTION

PATENT NO. : 5,664,178

DATED : September 2, 1997

INVENTOR(S) : Sinofsky et al.

It is certified that error appears in the above-identified patent and that said Letters Patent is hereby corrected as shown below:

Claim 1, column 7, line 7, after "file;" please cancel "for each computer program" and add a new line --for each computer program,--.

Claim 15, column 9, line 28, after "application" please add --program--.

Claim 23, column 10, line 61, after "application" please add --program--.

Signed and Sealed this

Twenty-eighth Day of November, 2000

Attest:

Q. TODD DICKINSON

Attesting Officer

Director of Patents and Trademarks